United States Patent
Maeda et al.

(10) Patent No.: US 8,045,106 B2
(45) Date of Patent: Oct. 25, 2011

(54) SUBSTRATE FOR LIQUID CRYSTAL DEVICE, ELECTRO-OPTIC APPARATUS AND ELECTRONIC EQUIPMENT

(75) Inventors: Hirotaka Maeda, Chino (JP); Akinori Hashizume, Chino (JP); Yoshio Taniguchi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 490 days.

(21) Appl. No.: 12/199,973

(22) Filed: Aug. 28, 2008

(65) Prior Publication Data

US 2009/0059149 A1 Mar. 5, 2009

(30) Foreign Application Priority Data

Aug. 30, 2007 (JP) .................................. 2007-223543
Jun. 18, 2008 (JP) .................................. 2008-158844

(51) Int. Cl.
*G02F 1/1333* (2006.01)

(52) U.S. Cl. ........................................................ 349/117
(58) Field of Classification Search ................... 349/117
See application file for complete search history.

(56) References Cited

FOREIGN PATENT DOCUMENTS

| JP | 2004-198955 | 7/2004 |
|----|-------------|--------|
| JP | 2004-240053 | 8/2004 |
| JP | 2005-249929 | 9/2005 |

*Primary Examiner* — Phu Vu
(74) *Attorney, Agent, or Firm* — Workman Nydegger (57) ABSTRACT

A substrate for a liquid crystal device includes: an electrode film provided on a display area on the substrate; an alignment film which covers at least the display area and is subjected to an alignment process by rubbing; and a band-shaped projection provided in a peripheral area outside the display area so as at least to intersect the rubbing direction and extend along the display area, in which the height of the band-shaped projection on the substrate is higher than the height of the surface of the electrode film.

10 Claims, 8 Drawing Sheets

ORIENTATION FLAT

FIG. 4

RUBBING DIRECTION

RUBBING DIRECTION ←

ORIENTATION FLAT

SUBSTRATE FOR LIQUID CRYSTAL DEVICE, ELECTRO-OPTIC APPARATUS AND ELECTRONIC EQUIPMENT

BACKGROUND

1. Technical Field

The present invention relates to a substrate for a liquid crystal device suitable for improving the image quality displayed on the liquid crystal device and a method of manufacturing the same, an electro-optic apparatus, and electronic equipment.

2. Related Art

A liquid crystal device which corresponds to an electro-optic apparatus is configured with two substrates such as a glass substrate or a quartz substrate, and liquid crystal encapsulated therebetween. There is the liquid crystal device employing an active system having non-linear elements such as TFTs (Thin Film Transistor) or TFDs (Thin Film Diode) provided on the pixel-to-pixel basis, and signal electrodes and pixel electrodes are electrically connected via the non-linear elements.

The liquid crystal device of an active system includes the non-linear elements arranged in a matrix pattern on one substrate and opposed electrodes arranged on the other substrate to enable display of images by changing the optical characteristics of the liquid crystal layer encapsulated between the substrates according to the image signals.

The TFT substrate having the TFTs arranged thereon and the opposed substrate arranged so as to oppose the TFT substrate are manufactured separately. These substrates are bonded to each other with high degree of accuracy in a panel assembly process, and then the liquid crystal is encapsulated therebetween.

In the panel assembly process, alignment films are formed on the opposed surfaces of the TFT substrate and the opposed substrate which are manufactured separately in the respective substrate manufacturing process, that is, on the surfaces of the opposed substrate and the TFT substrate which come in contact with the liquid crystal layer, and then a rubbing process is carried out. Then, a sealing member which corresponds to an adhesive agent is formed on peripheral sides on one of the substrates. The TFT substrate and the opposed substrate are bonded using the sealing member and are press-cured while being adjusted in alignment. The sealing member is formed with a notch, which is used for filling the liquid crystal.

When the alignment film is formed and applied with the rubbing process, the alignment of liquid crystal molecules when no voltage is applied is determined. The alignment film is formed by applying, for example, polyimide by a thickness of approximately several tens nanometers. By forming the alignment films on the surfaces of both the substrates opposing the liquid crystal layer, the liquid crystal molecules are aligned along the surfaces of the substrates. The rubbing process is a process to be applied to an alignment-anisotropic film by forming fine grooves on the surface of the alignment film, and the alignment of the liquid crystal molecules is defined by carrying out the rubbing process on the alignment film in a certain direction.

In consideration of productivity, an array manufacture in which film formation and a photolithography process are repeated on one piece of mother glass substrate without cutting the same to form elements for a plurality of TFT substrates on the mother glass substrate at once may be employed.

In the rubbing process, a rotating rubbing roller is slid on the surface of the substrate. Foreign substances generated by the rubbing process like chips of the alignment film move with the movement of the rubbing roller and are swept out of the substrate. However, since there generates a level difference at every element in the array manufacture, the chips generated during the rubbing process may remain on the adjacent elements due to the level difference.

Therefore, in JP-A-2004-240053, a technology to prevent entry of the chips generated during the rubbing process into the display area by forming projections in the peripheral area on the TFT array substrate is disclosed.

However, in JP-A-2004-240053, there is no disclosure relating to the opposed substrate manufactured by the array manufacture, and the chips generated during the rubbing process remain on the opposed substrate even with the technology disclosed in JP-A-2004-240053. When the chips enter the effective display area, there arises a problem such that the alignment of the liquid crystal molecules is disordered and hence the image quality is deteriorated at a portion where the chips are attached.

SUMMARY

An advantage of some aspects of the invention is achieved in the following modes.

According to a first aspect of the invention, a substrate for a liquid crystal device includes an electrode film provided in a display area on the substrate; an alignment film which covers at least the display area and is subjected to an alignment process by rubbing; and a band-shaped projection provided in a peripheral area outside the display area so as at least to intersect the rubbing direction and extend along the display area, and the height of the band-shaped projection on the substrate is higher than the height of the surface of the electrode film.

In this configuration, the height of the band-shaped projection provided along the display area on the substrate is higher than the height of the surface of the electrode film provided in the display area. Therefore, the band-shaped projection functions as a barrier wall, so that entry of the foreign substances entering from outside the display area into the display area during the rubbing process, such as chips of the alignment film or the substrate generated by rubbing is prevented.

Preferably, the projecting amount of the projection on the substrate is set to be at least larger than the thickness of the alignment film which covers the display area with respect to the surface of the electrode film.

The chips of the alignment film generated during the rubbing process have a size at least about the thickness of the alignment film. In this configuration, since the projecting amount of the band-shaped projection is at least larger than the thickness of the alignment film with respect to the surface of the electrode film, the chips of the alignment film are prevented from entering again the display area and adhering over the alignment film. In other words, disorder of alignment of the liquid crystal molecules due to re-adhesion of the chips on the alignment film is prevented.

Preferably, the substrate is a mother substrate, and includes a plurality of the display areas arranged in a matrix pattern.

In this configuration, entry and adhesion of the foreign substances during the rubbing process are prevented also between the plurality of display areas.

Preferably, the band-shaped projection extends to positions near outer edges of the mother substrate.

In this configuration, since the band-shaped projection is provided over a larger range, the chips generated during the rubbing process as the foreign substances are reliably prevented from entering the display area.

Preferably, a plurality of the band-shaped projections are provided along the display area.

In this arrangement, the foreign substances generated during the rubbing process do not enter the display area unless they climb over a plurality of projections. In other words, entry of the foreign substances is prevented further reliably.

Preferably, the band-shaped projections are formed of the same material as the electrode film.

In this configuration, provision of an additional film forming process for forming the band-shaped projections is not necessary.

Preferably, the electrode film is provided so as to cover the display area and the band-shaped projections.

In this configuration, since the electrode film is formed so as to cover the band-shaped projections formed of the same material as the electrode film, adhesiveness of the electrode film with respect to the projection is enhanced.

In a case in which the band-shaped projections are provided so as to be accommodated within the liquid crystal device, the thickness of the electrode film at positions corresponding to the band-shaped projections is substantially increased, and hence reduction of resistance of the electrode film is achieved.

According to a second aspect of the invention, a method of manufacturing a substrate for a liquid crystal device having a display area which is subjected to an alignment process by rubbing on the substrate includes: forming a band-shaped projection in a peripheral area outside the display area so as at least to intersect the rubbing direction and extend along the display area; and forming an electrode film so as to cover at least the display area, and the band-shaped projection is formed to have a height higher than the height of the surface of the electrode film in the display area.

In this method, the band-shaped projection is formed so as to extend along the display area and to have a height higher than the surface of the electrode film in the display area. Therefore, the band-shaped projection formed thereby serves as a barrier wall for preventing the foreign substances from entering the display area during the rubbing process. In other words, the substrate for a liquid crystal device in which the foreign substances can hardly enter the display area during the rubbing process is manufactured.

Preferably, the band-shaped projection is formed in such a manner that the projecting amount of the band-shaped projection on the substrate is set to be at least larger than the thickness of the alignment film which covers the display area with respect to the surface of the electrode film. In other words, the disorder of the alignment of the liquid crystal molecules due to the re-adhesion of the chips on the alignment film is prevented.

In this method, since the projecting amount of the band-shaped projection is at least larger than the thickness of the alignment film with respect to the surface of the electrode film, the chips of the alignment film are prevented from entering again the display area during the rubbing process and adhering over the alignment film.

Preferably, the substrate is a mother substrate, and includes a plurality of the display areas arranged in a matrix pattern, and the band-shaped projection is formed so as to extend to positions near outer edges of the mother substrate.

In this method, since the band-shaped projection is provided over a larger range, the substrate for a liquid crystal device which is able to prevent entry of the foreign substances generated during the rubbing process between the plurality of display areas of the mother substrate is manufactured.

Preferably, a plurality of the band-shaped projections are formed along the display area.

In this method, since the plurality of the band-shaped projections which correspond to barrier walls against the entry of the foreign substances are formed, the substrate for a liquid crystal device which is able to prevent the entry of the foreign substance generated during the rubbing process further reliably is manufactured.

Preferably, the band-shaped projections are formed of the same material as the electrode film and the electrode film is formed so as to cover the band-shaped projections.

In this method, since the band-shaped projections are formed so as to have a height higher than the height of the surface of the electrode film in the display area and is formed of the same material as the electrode film, the mutual adhesiveness is ensured.

When the band-shaped projections are formed so as to be accommodated within the liquid crystal device, the thickness of the electrode film at positions where the band-shaped projections are formed is substantially increased, and hence reduction of resistance of the electrode film is achieved.

Preferably, the method of manufacturing the substrate for a liquid crystal device further includes forming an insulating film so as to cover at least the display area, and the band-shaped projections are formed of the same material as the insulating film after having formed the insulating film, and the electrode film is formed on the insulating film after having formed the projections.

In this method, even when a conductive light-shielding film is formed between the surface of the substrate and the insulating film, the light-shielding film and the electrode film are electrically insulated by the insulating film. In other words, a film having a different function can be provided under the electrode film.

By forming the insulating film in such a manner that the surface becomes flat, even when the film having the different function is arranged under the insulating film, formation of the electrode film having a flat surface is achieved.

In other words, the substrate for a liquid crystal device having a thin film with an advanced feature and being capable of preventing easy entry and adhesion of the foreign substances generated during the rubbing process is manufactured.

According to a third aspect of the invention, an electro-optic apparatus includes an electro-optic substance interposed between first and second substrates arranged so as to oppose to each other, and one of the first and second substrates is the substrate for a liquid crystal device according to the first and second aspects of the invention.

In this configuration, since the electro-optic apparatus includes the substrate for a liquid crystal device according to first and second aspects of the invention, the liquid crystal device as the electro-optic apparatus in which the probability of occurrence of defective display due to the foreign substances generated during the rubbing process is lowered is provided.

According to a fourth aspect of the invention, electronic equipment includes the electro-optic apparatus according to the embodiment of the invention.

In this configuration, since the liquid crystal device as the electro-optic apparatus in which the probability of occurrence of the defective display caused by the foreign substances is provided, the electronic equipment having a high display quality is provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Referring now to the drawings, embodiments of the invention will be described in detail below. In the drawings used for description, the scales are different from the actual scale throughout the drawings in order to make respective members recognizable in the drawings.

First Embodiment

Figure 1:
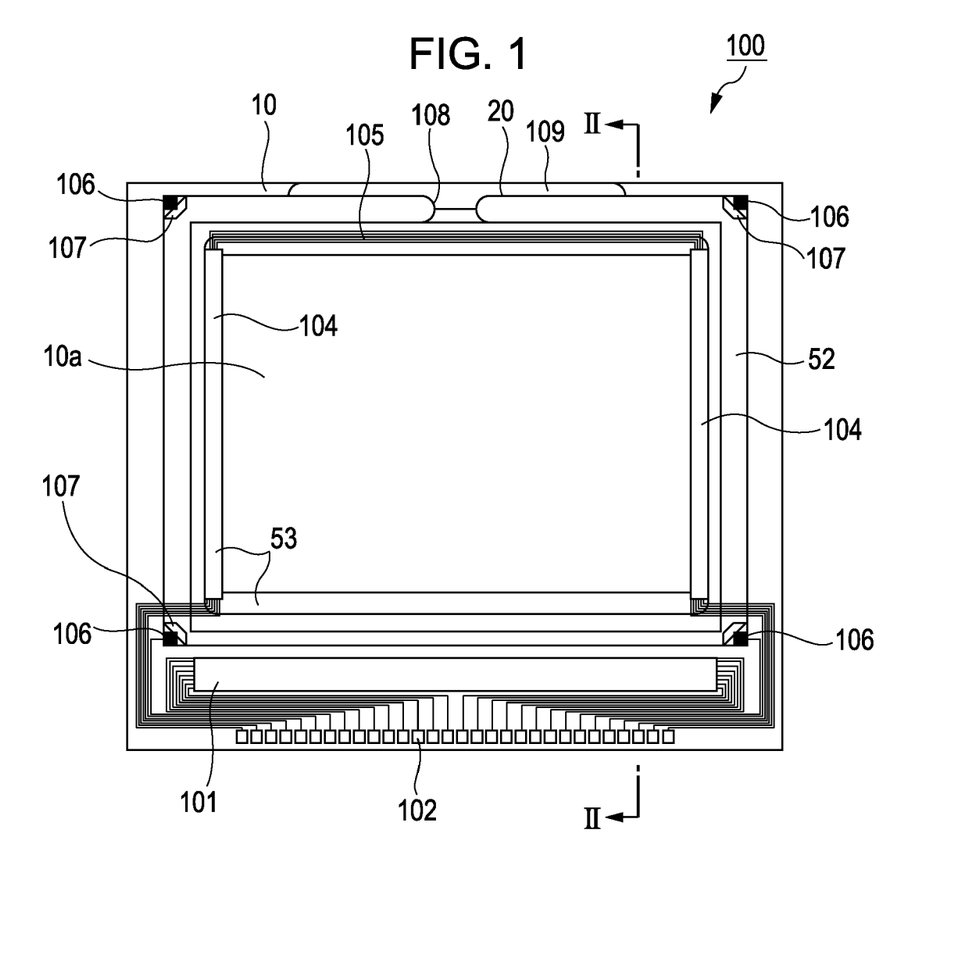
FIG. 1 is a schematic front view showing a configuration of a liquid crystal device.
Figure 2:
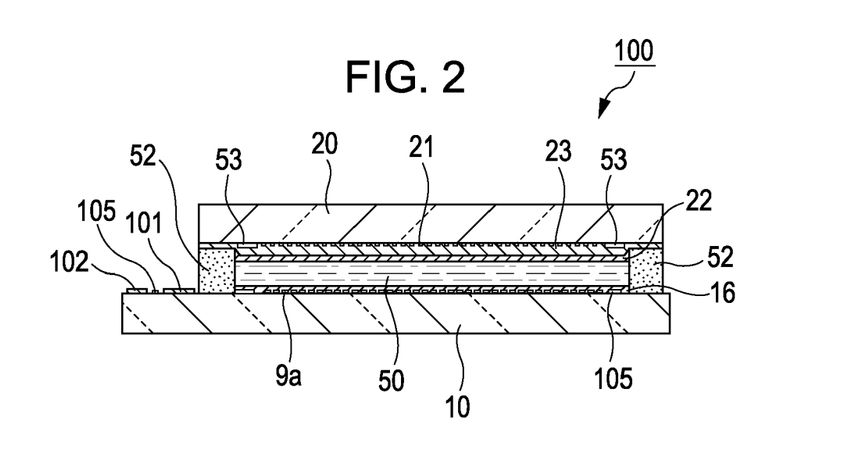
FIG. 2 is a cross-sectional view of the liquid crystal device taken along the line II-II in FIG. 1.

Referring now to FIG. 1 and FIG. 2, a liquid crystal device which corresponds to an electro-optic apparatus using a substrate for a liquid crystal device in a first embodiment will be described. FIG. 1 is a schematic front view showing a configuration of the liquid crystal device, and FIG. 2 is a cross-sectional view taken along the line II-II in FIG. 1.

As shown in FIG. 1 and FIG. 2, a liquid crystal device 100 in the first embodiment includes a TFT substrate 10 which corresponds to a first substrate using, for example, a quartz substrate, a glass substrate or a silicon substrate, an opposed substrate 20 as a second substrate opposed thereto using, for example, a glass substrate or a quartz substrate, and liquid crystal 50 as an electro-optic substance encapsulated between the TFT substrate 10 and the opposed substrate 20. The TFT substrate 10 and the opposed substrate 20 arranged so as to oppose to each other are bonded by a sealing member 52.

Pixel electrodes (ITO) 9a which constitute pixels are arranged on the TFT substrate 10 in a matrix pattern. An opposed electrode (ITO) 21 as an electrode film is provided on the entire surface of the opposed substrate 20. An alignment film 16 having been subjected to a rubbing process is provided on the pixel electrodes 9a on the TFT substrate 10.

On the other hand, an alignment film 22 having been subjected to the rubbing process is provided also on the opposed electrode 21 formed over the entire surface of the opposed substrate 20. The respective alignment films 16 and 22 are formed of a transparent organic film such as polyimide film.

An effective display area (hereinafter, referred simply to as "display area") 10a is provided at a center portion of the pixel area configured with the pixels on the TFT substrate 10, and an ineffective display area is provided in the periphery of the pixel area. An area other than the ineffective display area and the pixel area is a non-display area.

In the pixel area, a plurality of scan lines and a plurality of data lines, not shown, are wired so as to intersect with respect to each other, and the pixel electrodes 9a are arranged in a matrix pattern in the area partitioned by the scan lines and the data lines. The TFTs (not shown) are provided at positions corresponding to the intersections of the scan lines and the data lines, and the pixel electrodes 9a are electrically connected to the TFTs.

The TFTs are turned on upon reception of ON signals from the scan lines, whereby the image signals supplied to the data lines are supplied to the pixel electrodes 9a. The voltages between the pixel electrodes 9a and the opposed electrode 21 provided on the opposed substrate 20 are applied to the liquid crystal 50.

In order to prevent light from entering the TFTs, the opposed substrate 20 is formed with a light-shielding film 23 in a grid pattern in an area opposing the area in which the scan lines and the data lines are formed in the pixel area. The opposed substrate 20 is provided with a light-shielding film 53 as a frame for partitioning the effective display area 10a.

A part of the sealing member 52 is missing at one side of the TFT substrate 10, and a liquid crystal filling port 108 for filling the liquid crystal 50 is defined thereby. The liquid crystal is filled through the liquid crystal filling port 108 into a gap formed between the bonded TFT substrate 10 and the opposed substrate 20. After having filled the liquid crystal, the liquid crystal filling port 108 is to be sealed by a plugging material 109.

A data line drive circuit 101 which drives the data lines by supplying image signals to the data lines at a predetermined timing and an external connecting terminal 102 for the connection with respect to an external circuit are provided along one side of the TFT substrate 10 in an area outside the sealing member 52. Scanning line drive circuits 104 for driving the gate electrode by supplying scanning signals to the scanning lines at predetermined timing and the gate electrode, not shown, are provided along two sides which are adjacent to the one side. The scanning line drive circuits 104 are formed on the TFT substrate 10 at positions opposing the light-shielding film 53 inside the sealing member 52. On the TFT substrate 10, wirings 105 for connecting the data line drive circuit 101, the scanning line drive circuit 104, the external connecting terminal 102 and upper and lower substrates conducting terminals 107 are provided on three sides of the light-shielding film 53 so as to oppose to each other.

The upper and lower substrates conducting terminals 107 are formed at four corners of the sealing member 52 on the TFT substrate 10. Upper and lower substrates conducting materials 106 whose lower ends come into contact with the upper and lower substrates conducting terminals 107 and upper ends come into contact with the opposed electrode 21 are provided between the TFT substrate 10 and the opposed substrate 20 opposed to each other, and electrical conduction between the TFT substrate 10 and the opposed substrate 20 is achieved by the upper and lower substrates conducting materials 106.

The first embodiment is an example which is suitable for a case of manufacturing the opposed substrate 20 by an array manufacturing method which is superior in productivity. In the array manufacturing method, the plurality of opposed substrates 20 are cut out from a single mother substrate. In other words, film formation and a photolithography process are repeated without cutting the mother substrate fed during manufacture. In this manner, an opposed substrate array as the substrate for a liquid crystal device having the elements for the plurality of opposed substrates formed on the mother substrate is obtained. Then the individual opposed substrate 20 is obtained by cutting the opposed substrate array.

In the first embodiment, as described later, projections are formed on the mother substrate during the manufacturing process. The projections may or may not remain on the each opposed substrate 20 after having cut the opposed substrate array.

The TFT substrate 10 is also manufactured by the array manufacturing method as well. Therefore, the projections are preferably formed on the TFT substrate 10 in the same method as for the opposed substrate 20.

Figure 3:
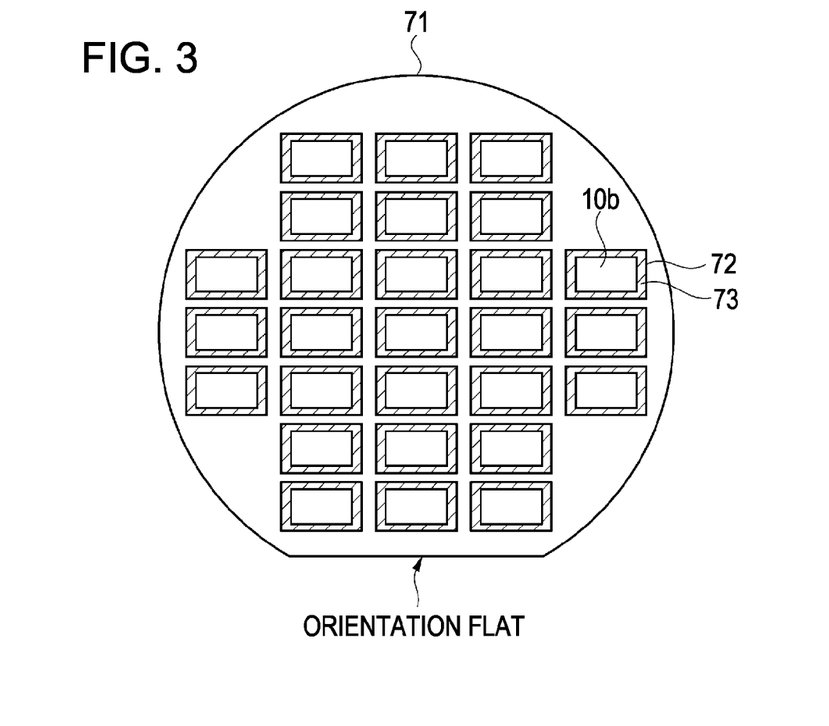
FIG. 3 is a schematic plan view showing an opposed substrate array.

FIG. 3 is a schematic plan view showing the opposed substrate array. The opposed substrate 20 is obtained by cutting an opposed substrate array 71 in, for example, a wafer shape shown in FIG. 3. The opposed substrate array 71 includes the plurality of elements 72 for an opposed substrate. The elements 72 each are formed with the light-shielding film 23, not shown in FIG. 3, in a display area 10b which corresponds to the effective display area 10a. The each element 72 is also formed with the light-shielding film 53 which surrounds and defines the display area 10b two-dimensionally. The opposed substrate array 71 is not limited to be the wafer shape, and may be square or polygonal, for example.

Figure 4:
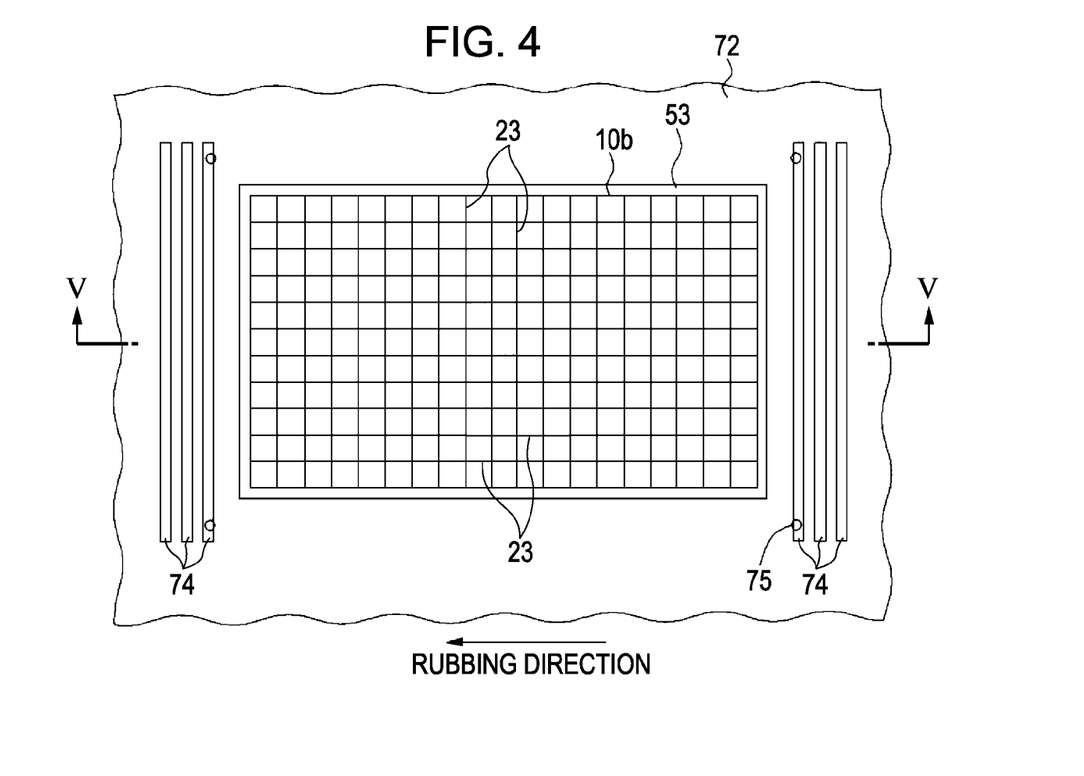
FIG. 4 is a schematic plan view showing a detailed configuration of an element in FIG. 3.

FIG. 4 is a schematic plan view showing a specific configuration of one element 72 in FIG. 3. As shown in FIG. 4, the each element 72 is formed with the light-shielding film 53 which defines the display area 10b. The light-shielding film 23 in a grid shape is formed in the display area 10b. Alignment marks 75 are formed at four positions outside the display area 10b for alignment of the opposed substrate 20 obtained by cutting out the element 72 with the TFT substrate 10 when bonding the same.

In the first embodiment, band-shaped projections 74 are formed in at least part of the portion of the opposed substrate array 71 other than the display area 10b of the each element 72 on the opposed substrate array 71. In the example shown in FIG. 4, the projections 74, having a rectangular shape in plan view, are formed in a portion other than the display area 10b along the two sides which are orthogonal to the rubbing direction of the display area 10b in a range wider than the range of the display area 10b. In other words, the projections 74 are formed so as to serve as barrier walls for preventing the foreign substances from entering the display area 10b at least in the rubbing direction. It should be noted that the "rubbing direction" is not merely a feature of the manufacture process, but is a feature that is retained in the finished liquid crystal display panel. That is, in the finished liquid crystal display panel, the surface of the alignment layer 22 is covered with minute scratches that follow the direction in which rubbing was performed. The "rubbing direction" can be ascertained by these scratches, and also by the alignment direction of the liquid crystal, which follows the scratches.

In the example shown in FIG. 4, the projections 74 have short sides in the same direction as the rubbing direction, and a plurality of the (three) projections 74 are arranged in parallel at predetermined pitches in the same direction as the rubbing direction.

Figure 5:
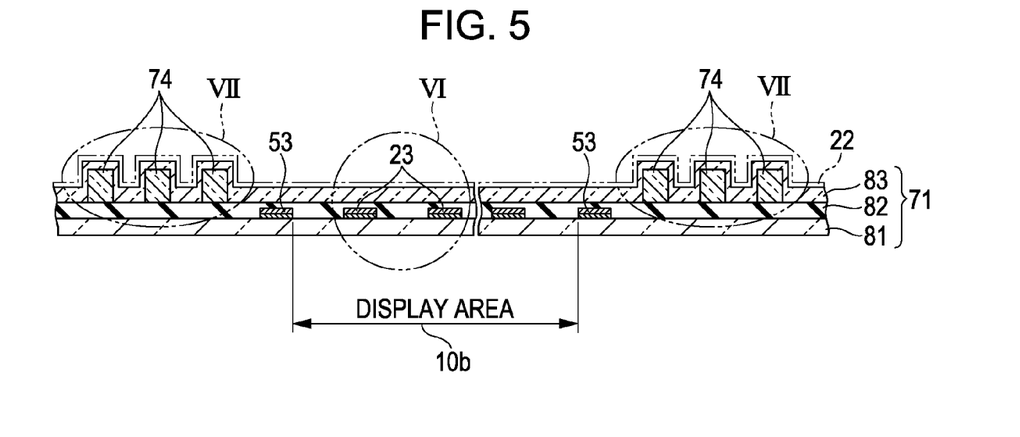
FIG. 5 is a schematic cross-sectional view showing configurations of each member taken along the line V-V in FIG. 4.
Figure 6:
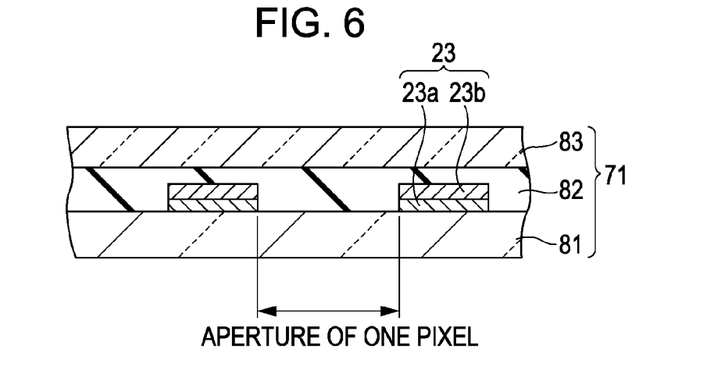
FIG. 6 is a drawing showing a portion VI in FIG. 5.
Figure 7:
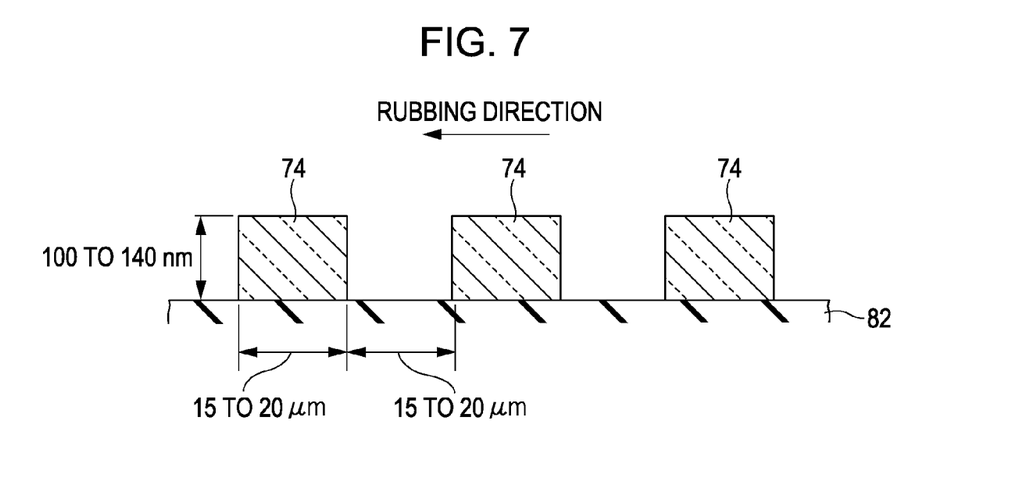
FIG. 7 is a drawing showing a portion VII in FIG. 5.

FIG. 5 is a schematic cross-sectional view showing configurations of the respective members taken along the line V-V in FIG. 4. FIG. 6 is a drawing showing a portion VI in FIG. 5, and FIG. 7 is a drawing showing a portion VII in FIG. 5.

As shown in FIG. 5 and FIG. 6, the opposed substrate array 71 includes a mother substrate 81 as a substrate formed of transparent glass, and the light-shielding films 23 and 53 are formed on the mother substrate 81 by pattern formation.

The light-shielding film 23 has a two-layer structure. The lower layer is a TiN (titanium nitride) film 23a and the upper layer is an AL (aluminum) film 23b. The light-shielding film 53 also has a two-layer structure having a TiN film as the lower layer and an AL film as the upper layer.

An inter-layer insulating film 82 is formed so as to cover the light-shielding films 23 and 53. The inter-layer insulating film 82 is, for example, an $SiO_2$ film. The projections 74 are formed on the inter-layer insulating film 82, and an ITO film 83 is as a transparent electrode is formed so as to cover the surface having the projections 74 formed thereon. The ITO film 83 in the display area 10b functions as an electrode film (opposed electrode 21).

The thickness of the light-shielding films 23 and 53 is on the order of 150 nm in total including, for example, 50 nm for the TiN film and 100 nm for the AL film, and the thickness of the ITO film 83 is about 140 nm. The inter-layer insulating film 82 is formed of NSG (Nondoped Silicate Glass) film, TEOS (TetraEthOxySlilane) film or the like, and is subjected to CMP (Chemical Mechanical Polishing) process.

In the examples shown in FIG. 5 and FIG. 7, the projections 74 are formed on the inter-layer insulating film 82. The projections 74 can be formed of the ITO film which is, for example, a transparent conductive material. The alignment film 22 is formed so as to cover the ITO film 83.

In the first embodiment, the projections 74 are formed so as to project from the surface of the ITO film 83 in the display area 10b. In other words, the height of the projections 74 is higher than the height of the surface of the ITO film 83 in the display area 10b. Therefore, in the area in which a group of the projections 74 are formed, the alignment film 22 on the projections 74 projects with respect to the alignment film 22 in the display area 10b.

Therefore, the chips generated in a display area 10b on the substrate during the rubbing process are trapped by the projections 74 provided on the downstream side of the display area 10b in terms of the rubbing direction, and hence are prevented from entering a display area 10b which is adjacent to the display area 10b. In other words, the chips generated during the rubbing process cannot enter the adjacent display area 10b beyond the three projections 74.

For example, when the thickness of the alignment film 22 is 50 nm, the projections 74 are preferably formed so as to be higher than the surface of the ITO film 83 in the display area 10b by at least 50 nm. In other words, the chips of the alignment film 22 are prevented at least from entering the display area 10b by forming the band-shaped projections 74 in such a manner that the projecting amount of the projections 74 is at least the same as the thickness of the alignment film 22 with respect to the surface of the ITO film 83.

In the first embodiment, the projections 74 are provided at the predetermined pitches. For example, as shown in FIG. 7, the length of the short sides of the projections 74 is from 15 to 20 μm, the height thereof is from 100 to 140 nm, and the mutual distance between the projections 74 is from 15 to 20 μm. Since the projections 74 are provided at the predetermined pitches in the rubbing direction, the chips generated during the rubbing process have a tendency to be trapped between the projections 74, and hence the chips are reliably prevented from moving beyond the group of projections 74 arranged at the predetermined pitches.

Dimensions of the projections 74 are not limited thereto. For example, the height may be set as needed when it is not stored in the liquid crystal device 100 later. When it is stored in the liquid crystal device 100, the height may be determined so as not to exceed the thickness of the liquid crystal 50.

Manufacturing Process

Figure 8:
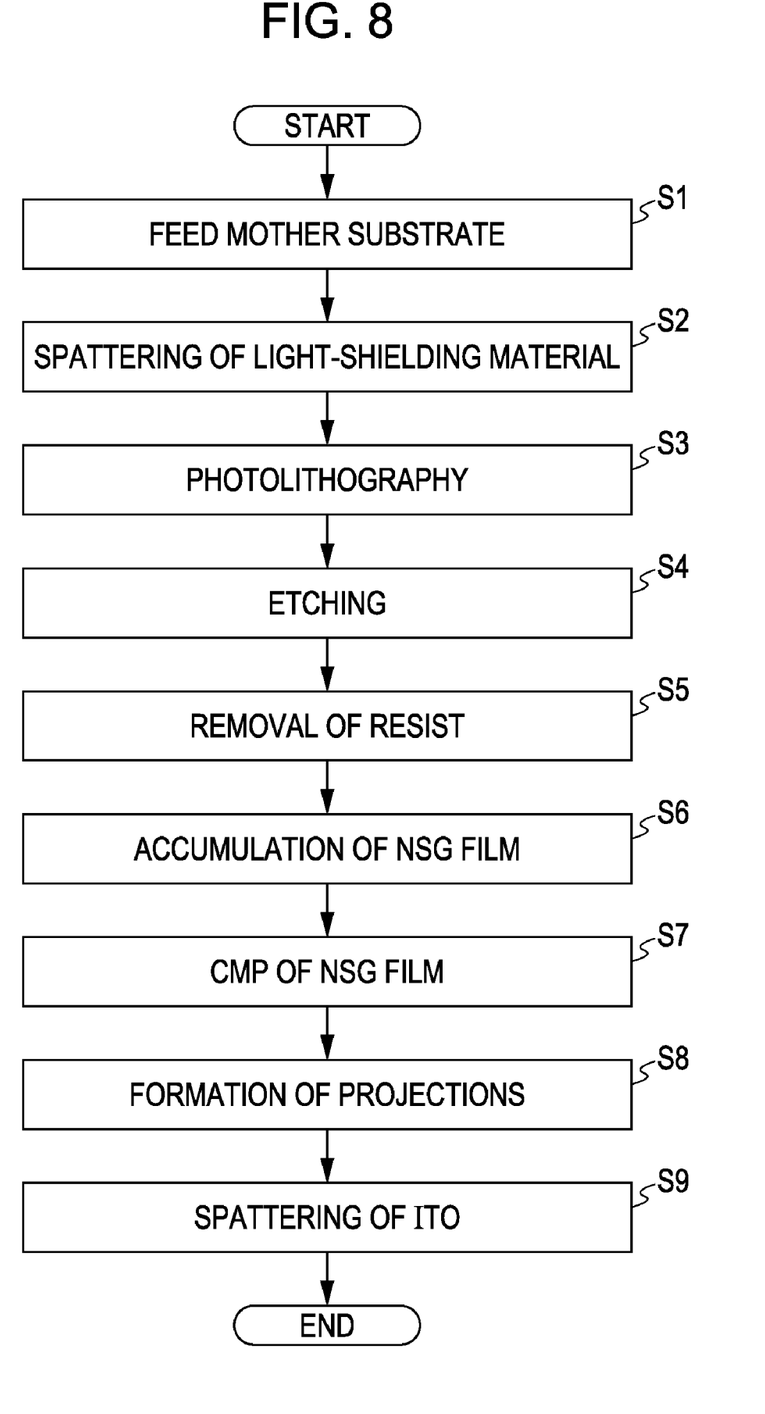
FIG. 8 is a flowchart showing a method of manufacturing the substrate for a liquid crystal device according to a first embodiment.
Figure 9:
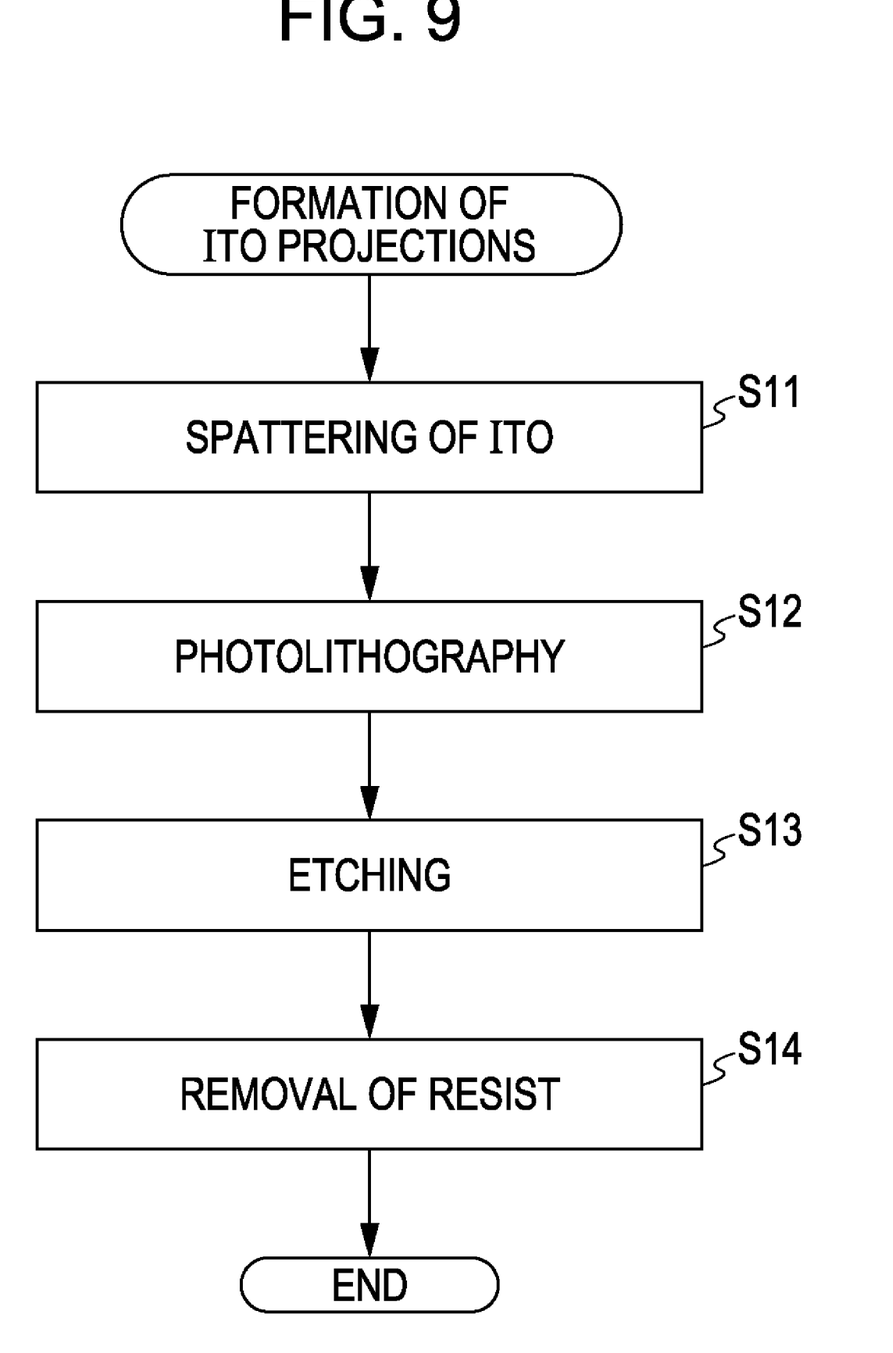
FIG. 9 is a flowchart showing a method of manufacturing the substrate for the liquid crystal device according to the first embodiment.

FIG. 8 and FIG. 9 are flowcharts showing a method of manufacturing the substrate for a liquid crystal device according to the first embodiment. FIGS. 10A to 10D are schematic cross-sectional views showing the method of manufacturing the substrate for a liquid crystal device. FIG. 8 shows a process of formation of the ITO film 83 of the opposed substrate array 71.

In Step S1 in FIG. 8, the mother substrate 81 is fed. The fed mother substrate 81 is subjected to a cleaning process for cleaning the surface on which various types of thin films are formed. In Step S2, the materials of the light-shielding films 23 and 53 are formed. For example, TiN and AL or only AL are spattered and are formed into a predetermined thickness. Then, in Steps S3 and S4, a photolithography process and an etching process are carried out and the formed TiN and AL are formed into the shape of the light-shielding films 23 and 53 by pattern formation. In Step S5, a resist formed in the photolithography process is separated.

In Step S6, for example, an NSG film is accumulated as a material of the inter-layer insulating film 82. Then, in Step S7, the accumulated NSG film is polished by CMP to a predetermined thickness. In Step S8, the projections 74 are formed. Finally, in Step S9, the ITO film 83 as the opposed electrode 21 is formed by spattering.

Figure 10A:
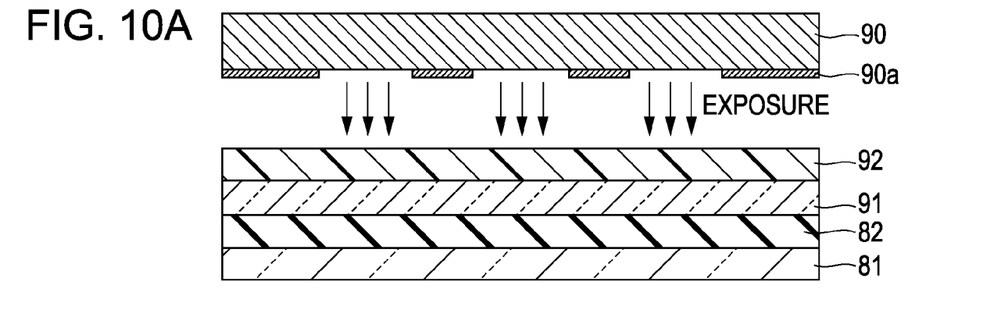
FIGS. 10A to 10D are schematic cross-sectional views showing a method of manufacturing the substrate for a liquid crystal device according to the first embodiment.
Figure 10B:
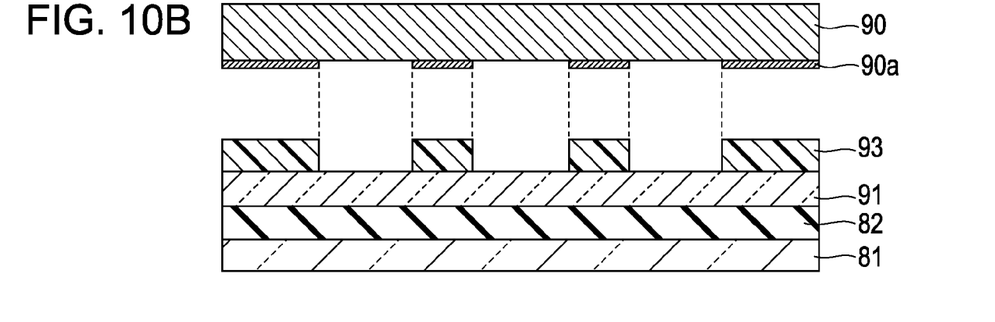

In the first embodiment, the projections 74 are formed on the inter-layer insulating film 82. FIG. 9 shows a process of forming the projections. In Step S11 in FIG. 9, as shown in FIG. 10A, an ITO film 91, which is a material of the projections 74, is formed by spattering. Then, in the photolithography process in Step S12 in FIG. 9, a resist 92 is formed over the entire surface, and the resist 92 is exposed using a mask 90 which has a mask pattern 90a according to the shape of the projections 74 in plan view. Then, the exposed portion of the resist 92 is removed and a patterned resist 93 is obtained (see FIG. 10B).

Figure 10C:
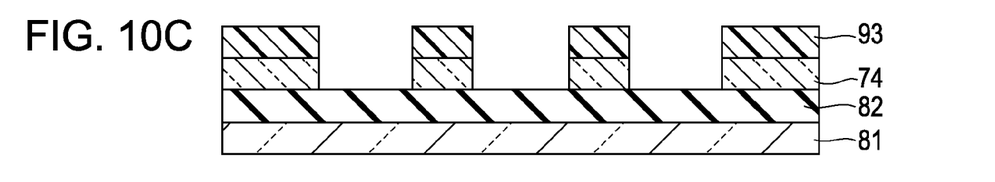
Figure 10D:
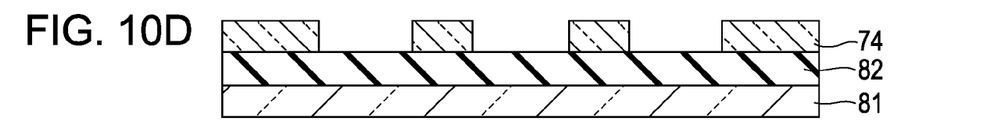

Subsequently, in the etching process in Step S13 in FIG. 9, as shown in FIG. 10c, the etching process is carried out with the mask of the resist 93, and the ITO film 91 is patterned to obtain the projections 74. Finally, in Step S14 in FIG. 9, the resist 93 is removed using remover liquid to form the projections 74 formed of the ITO film as shown in FIG. 10D.

In this manner, the projections 74 are formed on the inter-layer insulating film 82 by forming the ITO film by pattern formation. Then, the ITO film 83 as the opposed electrode 21 is formed so as to cover the surface having the projections 74 formed thereon. Therefore, a film forming process using a new material for forming the projections 74 is not necessary, and a film material to be formed on the opposed substrate array 71 is used for forming the projections 74, whereby increase in manufacturing facilities and the manufacturing steps is restrained.

In this manner, according to the first embodiment, the projections 74 which project with respect to the surface of the ITO film 83 of the display area 10b are formed in at least part of the periphery of the display area 10b. The band-shaped projections 74 are formed in such a manner that the amount of projection of the projections 74 is larger than the thickness of the alignment film 22 with respect to the surface of the ITO film 83 of the display area 10b. Accordingly, even when the rubbing process is carried out for the opposed substrate array 71 having the plurality of elements 72 for the opposed substrate arranged thereon, the chips generated during the rubbing process are prevented from entering the display area 10b of the adjacent opposed substrate 20 by the band-shaped projections 74. Accordingly, re-adhesion of the chips which deteriorate the image quality is prevented, and improvement of the image quality is achieved.

In the first embodiment, the band-shaped projections 74 are formed in the vicinity of the entire area where a rubbing roller with a rubbing member wrapped therearound passes when it enters the display area 10b, and hence the chips generated at an element 72 for an opposed substrate is reliably prevented from entering the display area 10b of an adjacent element 72 thereof. Furthermore, the side surfaces of the band-shaped projections 74 are provided at a right angle with respect to the direction of travel of the rubbing roller, and hence entry of the chips into the interior of the display area 10b is efficiently prevented. Furthermore, a plurality of the band-shaped projections 74 are provided at predetermined pitches, and hence entry of the chips into the display area 10b is prevented further efficiently.

In the first embodiment, the band-shaped projections 74 are formed using the ITO film. Since the ITO film is transparent, the alignment marks 75 on the opposed substrate 20 are observable via the projections 74. Therefore, the projections 74 are formed without considering the arrangement of the alignment marks 75, and hence the flexibility of design is enhanced.

Furthermore, the ITO film 83 which serves as the opposed electrode 21 is formed so as to cover the projections 74, which are formed of the ITO film. Since the projections 74 and the ITO film 83 are formed of the same material, adhesiveness therebetween is secured. When the projections 74 are stored in the liquid crystal device 100, reduction of the resistance of the opposed electrode 21 is achieved.

In a case in which the projections 74 are formed on the alignment marks 75, the projections 74 remain on the opposed substrate 20 cut from the opposed substrate array 71.

The arrangement and the shape of the projections 74 in the vicinity of the display area 10b are not limited to the example in the first embodiment, and the projections 74 may be configured at arbitrary positions and in arbitrary shapes. For example, the number of the projections 74 may be any numbers as long as there is at least one projection 74, and the shape in plan view does not have to be the rectangular shape. It is not necessarily required to arrange the plurality of projections 74 at regular pitches, and the shapes and the sizes of the plurality of projections 74 do not have to be the same.

Second Embodiment

Figure 11:
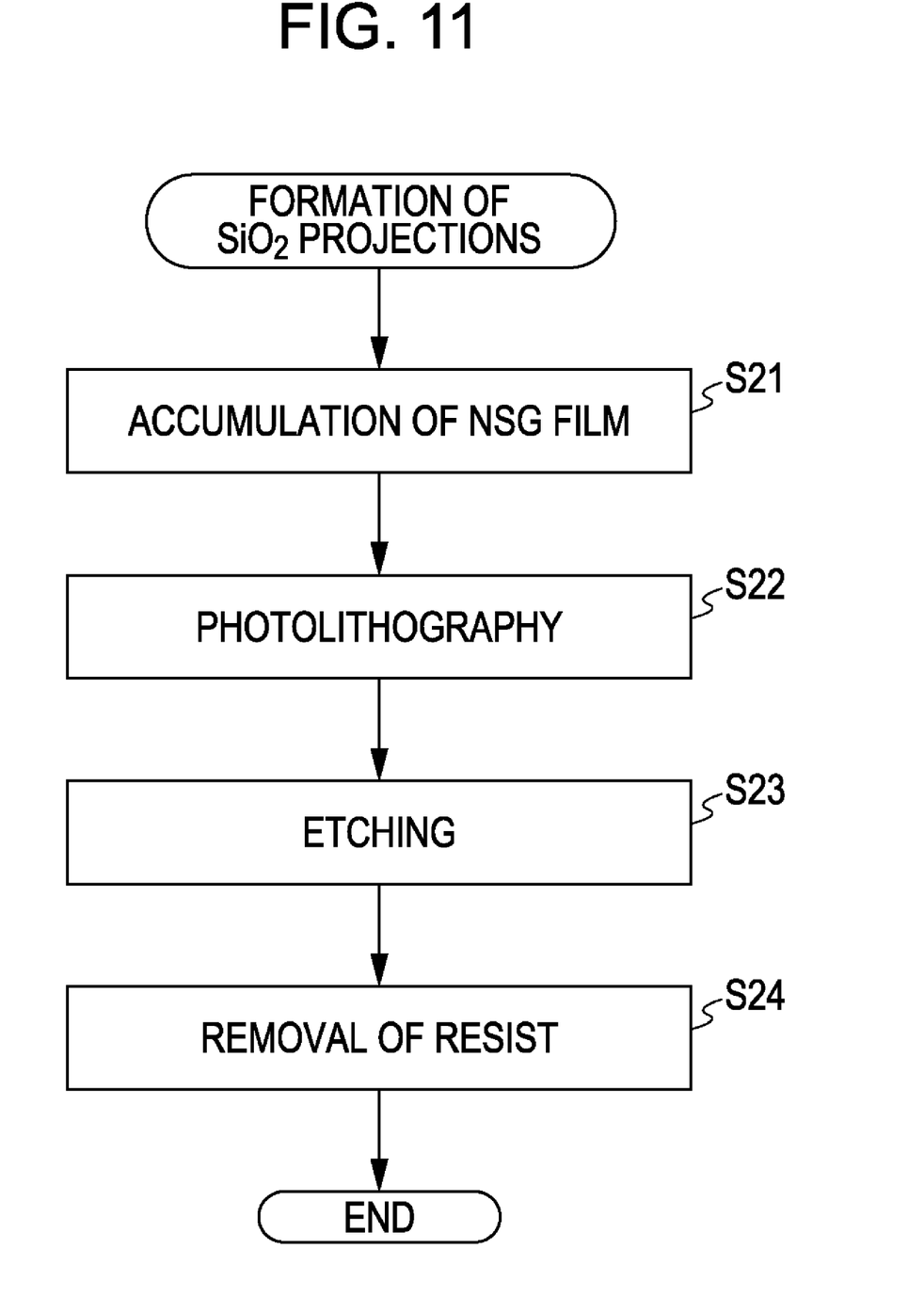
FIG. 11 is a flowchart showing a method of forming projections on the substrate for a liquid crystal device according to a second embodiment.

FIG. 11 is a flowchart showing a method of forming the projection on the substrate for a liquid crystal device according to a second embodiment. In the second embodiment, the projections 74 are formed of silicon oxide or the like which is the same material as the inter-layer insulating film 82.

In the second embodiment, the processes from Step S21 onward in FIG. 11 are carried out in the projection forming process in Step S8 in FIG. 8. In other words, in Step S21 in FIG. 11, an NSG film, which is the same material as that of the inter-layer insulating film 82 for forming the projections 74 is accumulated on the inter-layer insulating film 82 (see FIG. 5 and FIG. 6). Then, in the photolithography process in Step S22 in FIG. 11, a resist is formed over the entire surface, the resist is exposed using a mask corresponding to the shape of the projections 74 in plan view by an exposure apparatus, and the exposed portion of the resist is removed, so that the patterned resist is obtained.

Subsequently, in the etching process in Step S23 in FIG. 11, an etching process is carried out using the patterned resist as a mask, and the NSG film is patterned to obtain the projections 74. Finally, in Step S24 in FIG. 11, the resist is removed using the remover liquid, so that the projections 74 formed of the NSG film are formed. After having carried out an SiO$_2$ projection forming process, the processes of forming the ITO film 83 and the alignment film 22 are carried out. Other processes in the manufacturing method are the same as in the first embodiment.

In the second embodiment, only the different point from the first embodiment is that the band-shaped projections 74 are formed not of the ITO film, but of the same material as the inter-layer insulating film 82, and the shape, the size, and the arrangement of the projections 74 are the same as the first embodiment. Since the NSG film has the transparency as well, the same advantages as the first embodiment are achieved. In other words, the alignment marks 75 are visible even when the projections 74 are formed on the alignment marks 75.

The invention is not limited to the embodiments shown above, and the band-shaped projections 74 may be formed of films other than the ITO film 83 and the inter-layer insulating film 82. For example, the light-shielding film 53 is exemplified.

Third Embodiment

Figure 12:
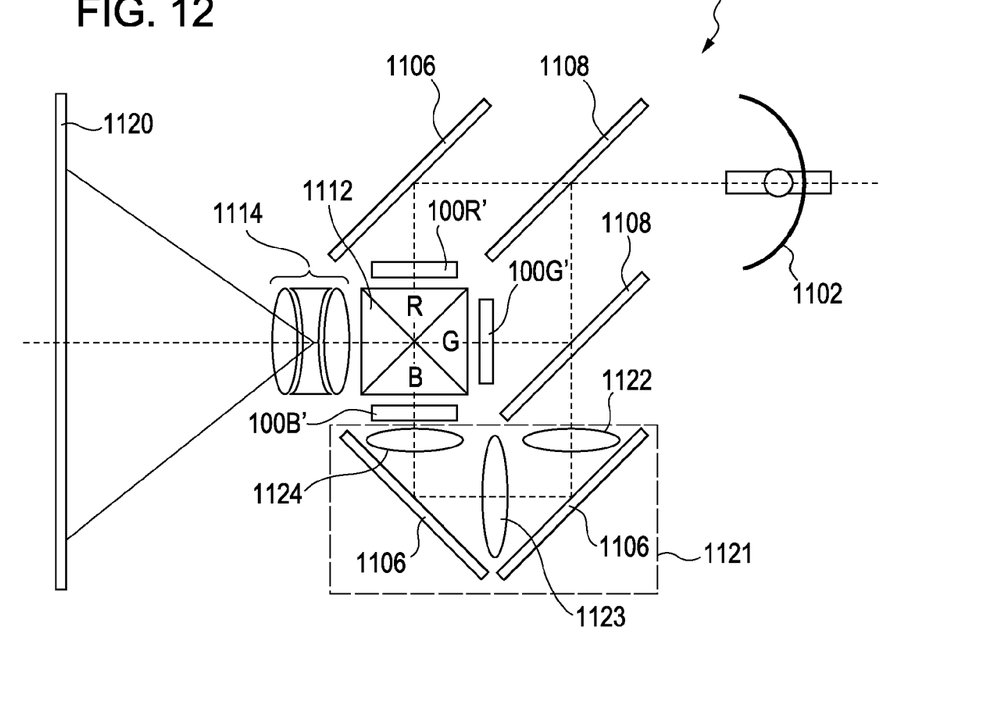
FIG. 12 is a schematic drawing showing a configuration of a projector as electronic equipment.

Subsequently, electronic equipment provided with the electro-optic apparatus having the substrate for a liquid crystal device according to the first or the second embodiment will be described with an example of a projection display apparatus, more specifically, a projector. FIG. 12 is a schematic drawing showing a configuration of the projector as electronic equipment.

As shown in FIG. 12, a projector 1100 includes the liquid crystal devices 100 (100R', 100G', 100B') as the three electro-optic apparatus which serve as light valves for R, G, and B.

In the projector 1100, when a projecting light is emitted from a lamp unit 1102 as a white light source such as a metal halide lamp, it is split into light components R, G, and B, which corresponds to three primaries of R, G, and B by three mirrors 1106 and two dichroic mirrors 1108, and is guided to the liquid crystal devices 100R', 100G' and 100B' corresponding to the respective colors in order to prevent optical loss due to a long optical path.

In this case, specifically the light B is guided through a relay lens system 1121 including an incident-side lens 1122, a relay lens 1123 and an outgoing-side lens 1124.

The light components corresponding to the three primaries modulated by the liquid crystal devices 100R', 100G', and 100B' are combined again by a dichroic prism 1112, and projected on a screen 1120 via a projection lens 1114 as a color image.

According to the projector 1100 in the third embodiment, since the liquid crystal devices 100R', 100G' and 100B' in which the foreign substances generated during the rubbing process are prevented from entering the display area 10b are mounted, probability of occurrence of defective display due to the foreign substances is reduced, and projection of a color image having a good appearance is achieved.

Other various modifications are considered in addition to the embodiments shown above. The modifications will be described below with examples.

Modification 1

Figure 13:
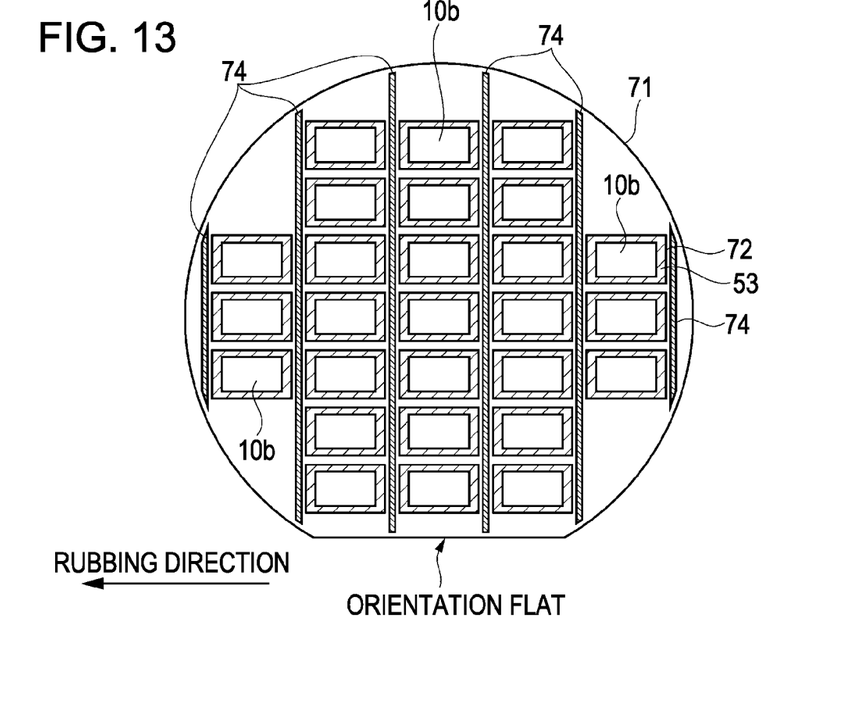
FIG. 13 is a schematic plan view showing a configuration of the opposed substrate array in a modification.

In the opposed substrate array 71 according to the first and second embodiments, the arrangement of the band-shaped projections 74 is not limited thereto. FIG. 13 is a schematic plan view showing an opposed substrate array in a modification. For example, as shown in FIG. 13, the projections 74 may be provided between the respective elements 72 for the opposed substrate arranged in a matrix pattern so as to extend to the positions near the outer edges of the opposed substrate array 71. In this arrangement, even when the rubbing direction is slightly skewed, or even when the rubbing direction is biased, entry of the foreign substances into the display area 10b is prevented since the projections 74 are provided over a wide range. In FIG. 13, one each of the band-shaped projection 74 is formed between the elements 72. However, as described in the first and second embodiments, a plurality of the projections may be formed.

Modification 2

The state of formation of the alignment film 22 in the first and second embodiments is not limited thereto. For example, in FIG. 3, the alignment film 22 does not have to be formed over the entire surface of the opposed substrate array 71 and must only be formed so as to cover at least the display area 10b. As a method of forming the alignment film 22 as such, a printing method represented by the offset method or the liquid drop discharging method in which a liquid material including an alignment film forming material is discharged as liquid drops from a nozzle may also be employed.

Modification 3

The configuration of the liquid crystal device 100 as the electro-optic apparatus in the first embodiment is not limited thereto. For example, a liquid crystal display module employing an active matrix system using an active element (positive element) such as a TFD (thin film diode) is also applicable.

The electro-optic apparatus may be a display device having elements formed on the semiconductor substrate, for example, a LCOS (Liquid Crystal on Silicon) In the LCOS, a monocrystal silicon substrate is used as the element substrate, and a transistor as a switching element used for the pixels or the peripheral circuit is formed on the monocrystal silicon substrate. The reflective pixel electrode is employed for the pixels, and the respective elements of the pixels are formed under the pixel electrode.

Modification 4

In the third embodiment, the electronic equipment having the liquid crystal device 100 mounted thereon as the electro-optic apparatus is not limited to the projector 1100. For example, a head-mount display or a viewer is exemplified.

What is claimed is:

1. A substrate for a liquid crystal device comprising:
   a substrate base;
   an electrode film provided in a display area over the substrate base;
   an alignment film which covers at least the display area and is subjected to an alignment process by rubbing; and
   a band-shaped projection provided in a peripheral area to the outside of the display area, the band-shaped projection having a band shape that extends following an edge of the display area in a direction that intersects the rubbing direction, the band-shaped projection projecting away from the substrate base to a height that is higher than the height of the surface of the electrode film, wherein the alignment film covers at least a portion of the band-shaped projection.

2. The substrate for a liquid crystal device according to claim 1, wherein the band-shaped projection projects beyond the surface of the electrode film by an amount that is larger than the thickness of the alignment film that covers the display area.

3. The substrate for a liquid crystal device according to claim 1, wherein the substrate base is a mother substrate, and includes a plurality of display areas arranged in a matrix pattern.

4. The substrate for a liquid crystal device according to claim 3, wherein the band-shaped projection extends to positions near outer edges of the mother substrate.

5. The substrate for a liquid crystal device according to claim 1, further including a plurality of band-shaped projections that extend following the edge of the display area.

6. The substrate for a liquid crystal device according to claim 1, wherein the band-shaped projections are formed of the same material as the electrode film.

7. The substrate for a liquid crystal device according to claim 6, wherein the electrode film is provided so as to cover the display area and the band-shaped projections.

8. A substrate for a liquid crystal device comprising:
 a substrate;
 an electrode film provided in a display area over the substrate;
 a light-shielding film surrounding the display area;
 an alignment film which covers at least the display area and is subjected to an alignment process by rubbing; and
 a band-shaped projection provided at a position outside the light-shielding film, the band-shaped projection having a band shape that extends following an edge of the display area in a direction that intersects the rubbing direction, the band-shaped projection projecting away from the substrate to a height that is higher than the height of the surface of the electrode film.

9. The substrate for a liquid crystal device according to claim 8, further including an interlayer insulating film that covers the display area and outside of the display area, the interlayer insulating film being polished to predetermined thickness, the band-shaped projection provided on the polished interlayer insulating film.

10. The substrate for a liquid crystal device according to claim 8, wherein the alignment film covers at least a portion of the band-shaped projection.

* * * * *